April 21, 1959  E. G. JOHNSON  2,883,220
ELECTRICAL CONNECTORS
Filed Nov. 9, 1953  2 Sheets-Sheet 2
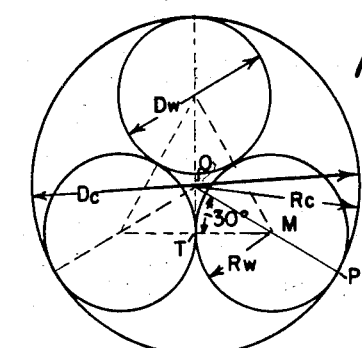
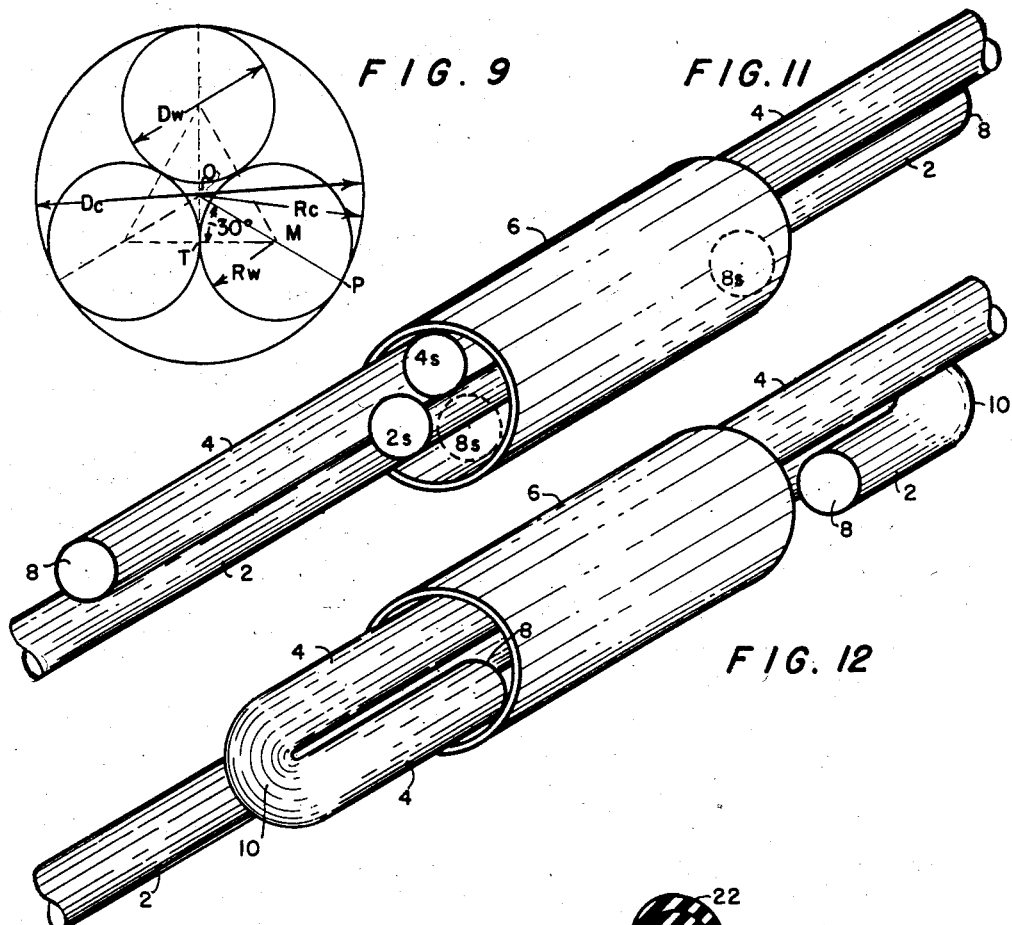
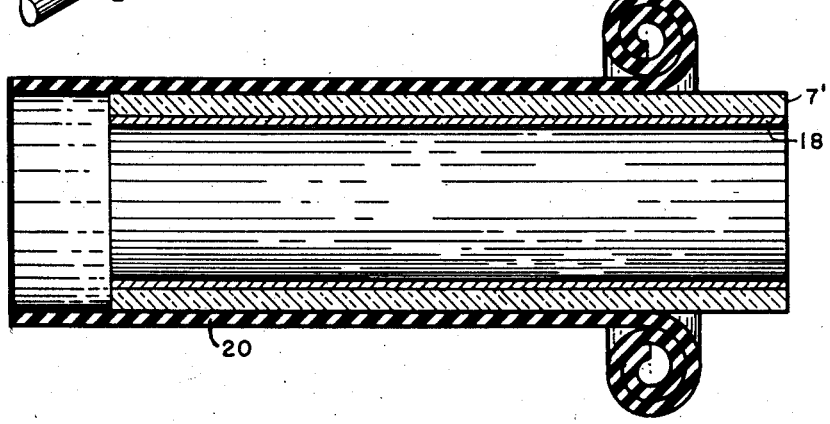

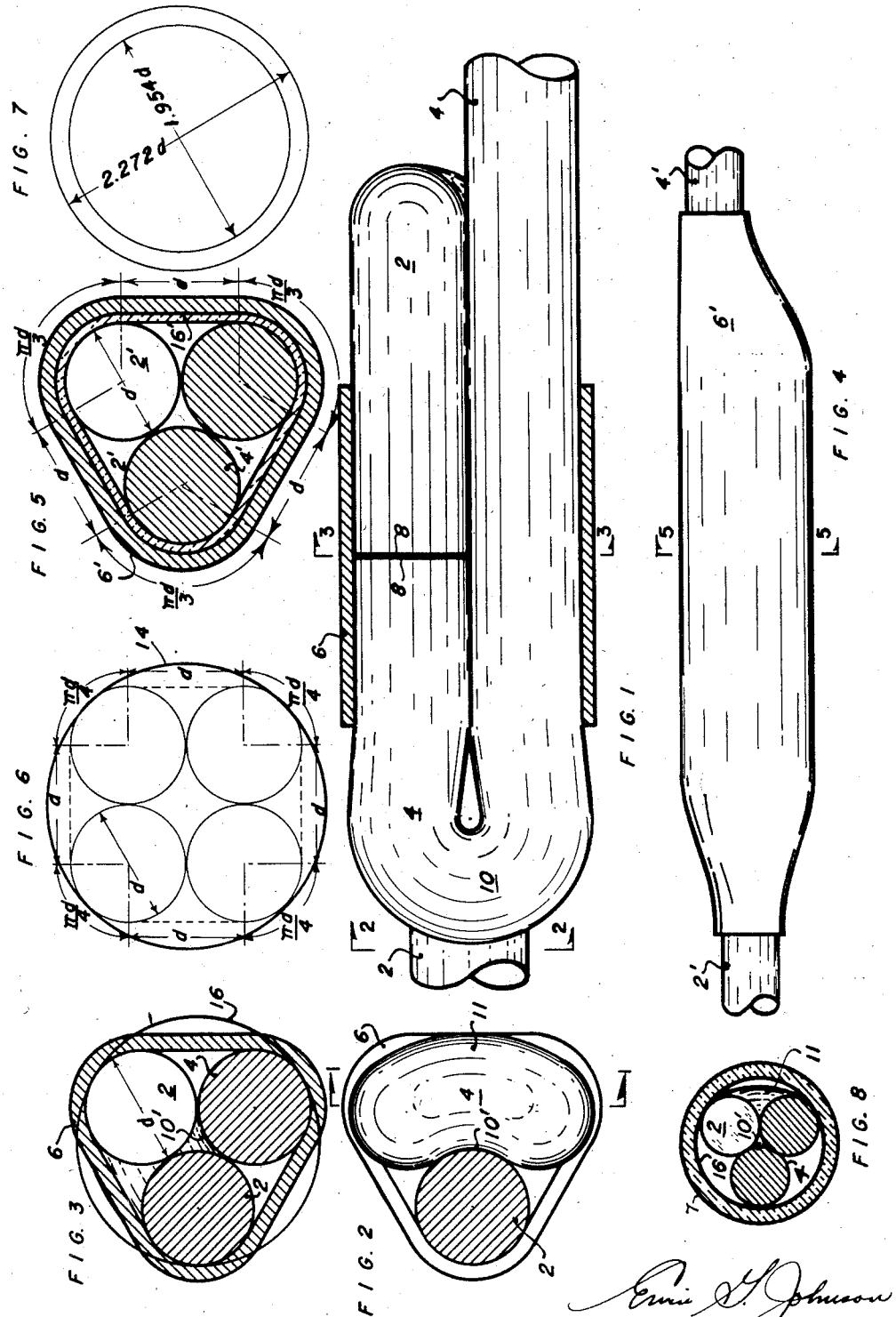

United States Patent Office
2,883,220
Patented Apr. 21, 1959

2,883,220

ELECTRICAL CONNECTORS

Ervin G. Johnson, Oakland, Calif., assignor to Eleanor de Haas Johnson, Oakland, Calif.

Application November 9, 1953, Serial No. 390,785

9 Claims. (Cl. 287—78)

This application is a continuation in part as to my application Ser. No. 558,891, filed October 16, 1944, and allowed May 11, 1953, now forfeited.

This invention relates to the splicing of electrical conductors, and especially to splices for small electrical wiring such as lighting circuit wiring, magnet wire, and the like.

It is the principle object of this invention to provide a simple and low cost splice.

It is another object of this invention to provide a method of making a splice which removes the need for the use of tools in the making of a splice to have both high conductivity and high mechanical strength.

It is another object of this invention to provide for the making of a splice and the insulation of the splice concurrently.

Another object of the invention is to provide a splicing unit which embodies the means of forming a joint having mechanical strength corresponding to a solderless joint, and electrical conductivity equal to that of a soldered joint, which mechanical strength is independent of the strength or weakness of a soldered joint.

Other objects of the invention will become apparent to those skilled in the art upon reference to the following specification and to the accompanying drawing, wherein:

Fig. 1 is a section taken longitudinally of a splice according to my invention, as on the plane 1—1 of Fig. 2;

Fig. 2 is a section at plane 2—2 of Fig. 1;

Fig. 3 is a section at plane 3—3 of Fig. 1;

Fig. 4 is an elevation of a slightly modified splice;

Fig. 5 is a section at plane 5—5 of Fig. 4;

Fig. 6 is a diagram explanatory of some points to be emphasized;

Fig. 7 is another diagram explaining points to be emphasized;

Fig. 8 is a section illustrating a modification of the connector;

Fig. 9 iluustrates mathematical relationships;

Fig. 10 is a section through a modification; and

Figs. 11 and 12 illustrate steps in the method of the invention.

Two wires to be joined to form a continuous conductor, are shown at 2 and 4. These are shown as of right circular section, and of single stranding. Plural stranding of the wires, and wires of different cross sectional shapes, may be joined in a manner similar to the manner here described, as will be apparent.

In the embodiment of Fig. 1, a simple sleeve 6 forms the third and completing member of the joint.

The method of forming the joint is shown in Figs. 11, 12 and 1, and is (1) to slip the ends of the wires while straight in opposite directions through the sleeve so that a length of each end protrudes as in Fig. 11. The ends of the wires are (2) each now doubled back along the body of the wire of which it forms a part as in Fig. 12, to form an abutment portion 8 on the end of each wire. The abutment portions 8 are next (3) guided into the sleeve while pulling the wires 2 and 4 in the opposite directions. Abutment portions 8 abut upon each other within the sleeve.

For small wires, such as can be doubled upon each other as shown by hand, the joint can be effected without the aid of tools. If the wire must be bent by means of a tool, the bending tool only will be necessary to effect a good joint.

The sleeve 6 may be of the configuration, or internal cross section, as shown, so that it will receive only the three cross sectional areas of the wire, the shape being such that the inside surface of the sleeve contacts a maximum surface on each of the conductors. The internal peripheral distance around the outsides of three circular conductors as shown in Fig. 5, equals the distance around one conductor plus three times the diameter of the conductor. This is the minimum internal periphery of the sleeve for making the joint as shown in Figures 1, 2 and 3. When so designed, a very effective low resistance solderless connection of great mechanical strength results from the fact that the bend 10 of each wire bears against the other wire and forces it against the sleeve, and also, in so doing, bears against the other corners in the sleeve. In view of the fact that the loop resists a bend having a zero spacing at the crotch, the loop also stretches the sleeve and edges, under tension, forming a compression joint between the contacting surfaces of the sleeve and the conductors on one hand, and being contacting surfaces of the conductors on another.

The sleeve 6 may be made of a thin section of metal, such as copper, or of insulating tubing, as sleeving made of glass fibers, or of a thick rigid section of metal or rigid tubing, such as glass or porcelain tubing. In any case of these, the inside periphery of the sleeve needs to be large enough to permit the three conductor sections to occupy the surrounded space inside the sleeve.

The sleeve 6 may have an inside peripheral distance substantially greater than the distance around as shown in Figs. 2 and 3. Thus, if the sleeve 6 is made of a rigid material, so that it cannot be distorted by the wire pulling step sufficiently to allow the wire to slip through, the sleeve may be of right circularly cylindrical cross section, and of not as great a diameter as the circumscribing circle about four cross sections, as at 14 in Fig. 6. If the sleeve 6 is made of flexible material, as glass fiber or thin copper, which are assumed to not stretch but only to deform, the internal periphery must, from Figure 6, be less than the distance around one wire, plus four wire diameters, for under this condition the bent wires cannot pass each other without being compressed together. The shape of the inside of a tube 6 of copper, may be rolled from a right circular cylindrical thin-walled tube having the minimum inside diameter $D_m$ equal to 1.954 times the wire diameter, and a maximum inside diameter $D_{max}$ equal to 2.272 times the wire diameter. The inside diameter of the stock tube to use for such rolling should lie within these limits of dimensions. These dimensions result from geometrical considerations. Referring to Figure 3, the peripheral distance $Dp$ around the three conductors of diameter $d$ is equal to $3d$ plus $3.1416 \times d$. The internal diameter of a tube which has the same internal peripheral distance is $Dm$ equals $Dp$ divided by 3.1416 or $1.954d$ so that a tube of slightly more than this internal diameter reshaped to the shape of Fig. 3 as by rolling, accommodates three wires of diameter $d$ in the manner shown and described. Again, referring to Fig. 6, it is clear that the minimum peripheral distance around the four wire sections of diameter $d$ is $4d$ plus $3.1416d$ which equals $7.1416d$ and the internal diameter of a right cylindrical tube reshaped to surround four sections of wire of diameter $d$ is $2.272d$. This larger diameter fixes a non-rigid tube diameter and periphery any value less than which prohibits four wire sections from occupying the same cross section and hence prevents the wires from slipping by one another. Such tube diameter needs to be slightly less than $2.272 \times d$. The details of Fig. 5 are described more fully hereinafter.

If the sleeve 6 is rigid, its minimum internal diameter, if right-circular cylindrical, must circumscribe the three cross sections of the wire, as shown in Figure 8, and as illustrated by the circle 16 in Fig. 3, which circle corresponds to the inside diameter of tube 7 in Fig. 8. The maximum internal diameter of a rigid cylindrical tube of circular cross section through which four wire cross sections cannot slip is also illustrated in Fig. 6 by circle 14, the radius of which equals the product (radius of wire) $\times$ (square root of two) plus (radius of wire) which sum equals the product (radius of wire) $\times$ (1 plus square root of 2) which equals the product (radius of wire) by (2.414), or the internal diameter of such rigid cylindrical tube should be less than 2.414 times the diameter of the wire.

Therefore the limits of tube diameters which will both accommodate three wires, and yet force at least portions of ends 8 of the wires to abut each other, are to be more than $1.954d$ and less than $2.414d$, where "$d$" is the wire diameter.

While the mechanical joint in the modification of Figures 1, 2 and 3 is both mechanically and electrically well made, it is recognized that a soldered joint increases the conductivity of the joint, and effects a resistance which will not vary with time; and, in addition, will protect the mechanical joint from wear, which results from exercising the joint of Fig. 1, by keeping the parts of the joint in rigid relative position.

To effect a soldered joint, or not as one pleases, the sleeve 6' of Fig. 5 is made of an internal periphery larger than the minimum periphery above defined for sleeve 6, but still within the maximum periphery set for the sleeve in order to prevent the four wire sections from occupying a single cross section in the tube. A liner 16' of solder is joined to the surface of the inner periphery of the sleeve 6, the inside periphery of which solder liner is such as to permit the three conductors to pass and occupy a single cross section of the sleeve. A suitable paste for a solder flux may form a part of the sleeve, being packed into the inside of the sleeve in manufacture.

The method of making the joint is similar to that outlined for Figures 1 through 3, with the addition of a further step. The solder is melted by applying a match or any suitable source of heat, as a current passed through the joint of sufficient value to melt the solder. The conductor ends will have been cleaned before passing into the sleeve.

As shown in Fig. 4, the sleeve 6' may be made of sufficient length and large enough, within the limits defined, to receive the loops therein and have the ends of the sleeve crimped in to form a cuff around the wires 2' and 4'. Any solder melted within the sleeve will, accordingly seal the joint, and the result is a neat and safe joint having a minimum resistance and maximum mechanical strength in tension and compression.

It will be clear from the foregoing that, for maximum security of the joint and electrical conductivity, the species of Figures 1, 2 and 3 is preferred where solder is not desired. In this case it is desirable that the inside periphery of the tubular member be just large enough to permit the three cross sections of the conductor to lie within the space provided by and within the sleeve 6. For this purpose, the sleeve is formed to have three flat sides of a width equal to the diameter of the wire, and three circular sides of 120° each and radius equal to the wire radius. It follows, therefore, and from a consideration of Fig. 5, that the ratio of the length of the arcuate portion to the width of the flat portion is pi multiplied by the wire diameter divided by three and the result divided by the wire diameter, which ratio is 3.1416 divided by 3.

For a slip fit, these dimensions are sufficiently exceeded to enable the wires to slip in without binding. The binding action to be later produced by pulling 2 and 4 in opposite directions, is illustrated by Figure 2 in which it is seen that the bend 10 of wire 4 is bearing against the area 10' on wire 2 thus stretching the bend 6 and causing pressure contact on all of the arcuate surfaces of contact between the wire and the sleeve.

This same action is obtained with the tinned sleeve of Fig. 5, wherein the inside surface of the tin is of equal perimeter to that of Fig. 1. It is unnecessary to melt the tin, for it will also form the solderless joint.

It is clear that, if a tube of rigid material, or relatively rigid material is used, it may be right circular in area and of a diameter (internal) corresponding to the diameter of the circumscribing circle 16, which is tangent to the three contacting wire sections in Fig. 3. The tube can even be smaller than circle 14 in Fig. 6, and the four conductor sections will not pass, except by distorting the tube, as shown in Fig. 6. Since it is assumed in this paragraph that the tube is rigid, there can be no distortion effective to permit the coexistence of four cross sections of conductor within the sleeve, and hence the slipping by of the abutment portions 8 of the conductor ends.

In Fig. 8 a connector of cylindrical cross section, which is circular on the inside dimension, having a perimeter providing a slip fit with the bunched three conductor sections, is illustrated. The sleeve 7 may be of any material having a degree of substantial rigidity. The internal diameter of this sleeve must be slightly greater than 2.1546 times the diameter of the wire to be accommodated in order to provide this slip fit, a fact readily deducible by simple geometry. Referring to the relationship illustrated by Fig. 8, let the diameter of the wire 2 be symbolized by $Dw$ and let the diameter of the circle 16 (See Fig. 3) which circumscribes the three sections of conductors 2 and 4 be symbolized by the letters $Dc$. This circumscribing circle 16 corresponds to the inner periphery of sleeve 7. Fig. 9 is provided to show the derivation of the relationship $Dc$ equals $2.1547 \times Dw$.

In Fig. 9, $Dc$ equals $2Rc$; $Dw$ equals $2Rw$ where R refers to the radius in each case. The center O of the circumscribing circle is distant from any point P on the circle by the two line segments PM and OM which together equal $Rc$. But $Rw$ equals $PM$; and $OM$ equals $Rw \times$ (secant 30°). So $Rc$ equals $Rw$ plus $Rw$ sec. 30° and therefore $Rc$ equals $Rw$ (1 plus sec 30°); or $Rc$ equals $2.1547 Rw$. Therefore $Dc$ equals $2Rc$ equals $2.1547 \times Dw$. This value is the limit, and a slip fit will result from using a value slightly larger than this.

As the loop portion 10 of a wire is pulled inside the tube 7 the loop itself is bulged out as at 11, and since the loop resists this bulging action, it is clear that the three cross sections of wire are compressed together and that the portions of the wires in contact with the sleeve are forcibly compressed against the interior surface of the sleeve. This results in a solderless joint. Of course, if the sleeve 7 be of porcelain, the sleeve itself does not act as a conductor. However, it does act as an insulator. Inasmuch as the metallizing of ceramic surfaces is now a well understood art, it is evident that the interior surface of a porcelain tube occupying the relation of Fig. 8, element 7, can be metallized with silver or any other conductor to improve its conductivity. Thus as shown in Fig. 10, a tube 7' of porcelain or the like is internally metallized with a film of metal.

When the connector 7 or 7' is to be used with insulated wire, so as to require an insulating joint as well as a mechanical and electrical joint, this sleeve 7, as well as sleeves 6 or 7' in similar relations, is provided as in Fig. 10 with a rubber sleeve 20 surrounding it and extending in both directions at the ends. This sleeve may be rolled up, like a sock as shown in Fig. 10 at 22, while making the joint as above described, and then extended to surround the wire insulation. In this way a serviceable joint is made without the need for tape since the rubber sleeve may be made elastic and tight enough to grip the insulation of the wire.

If the abutting end of the wire 8 be made relatively short with respect to the length of the tube 6, so that, upon exerting considerable pull on the strands 2 and 4 the bend 10 comes nearly or into the end of the sleeve, it is found that as much force is required to force the ends 8 apart by compression, as is necessary to make the joint. While the joint is not primarily intended to resist compression, being for electrical purposes provided as a tension and electrical joint, it is nevertheless clear that resistance to disjointing by the occurrence of a compression of the two parts of wire joined, is beneficial in preventing the accidental disjoinder of joints normally in tension; and can be utilized as a primary function in wires designed to embody a joint in compression. Moreover, the rigid joint so effected resists wear in itself through exercise caused by vibration and flexing. The bulge 11, Fig. 2, increases the area required about .7%.

It is furthermore clear that this joint is applicable to the joining of small tubing having rigid walls, and squared off ends, a small amount of packing being desirable between the abutting ends of the walls to effect a desired seal.

Having thus described my invention, its construction and use, I claim:

1. A joint comprising two linear members of uniform cross section, each member being folded upon itself to have an endmost portion lie along its main portion, each endmost portion of each member lying in contact with the main portion of the other member, and having its end in opposition to the end of the other endmost portion; and means binding said members in said defined relation.

2. A joint according to claim 1, said binding means comprising a tube.

3. A joint according to claim 2, said tube having generally triangular internal cross sections.

4. A joint according to claim 2, said tube having generally circular internal cross sections.

5. A joint according to claim 1, said binding means comprising a sleeve of insulating material.

6. A joint according to claim 1, said binding means comprising portions which with respect to each other are relatively fusible and non-fusible.

7. A joint according to claim 1, and a rubber sleeve over said binding means.

8. A joint according to claim 1 in which said means comprises a tube having an internal cross sectional area bounded by three straight lines joined by three curved lines.

9. The combination of claim 1 in which said cross section is circular and said means binding said members has formed therein a tubular opening having a circumference between 6.14 and 7.58 times the diameter of said section.

References Cited in the file of this patent

UNITED STATES PATENTS

| | | |
|---|---|---|
| 272,524 | Brott | Feb. 20, 1883 |
| 704,869 | Fischer et al. | July 15, 1902 |
| 2,586,646 | Graham | Feb. 19, 1952 |

FOREIGN PATENTS

| | | |
|---|---|---|
| 12,668 | Great Britain | Aug. 5, 1887 |
| 410,043 | Italy | Mar. 20, 1945 |